E. R. BAKER.
Wagon Hub.
No. 81,127.
Patented Aug. 18, 1868.
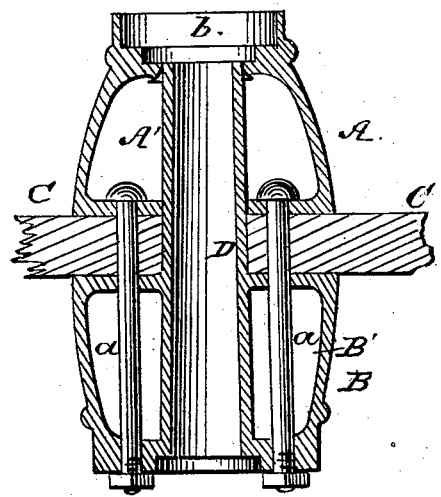

UNITED STATES PATENT OFFICE.

EDWIN R. BAKER, OF FAIRHAVEN, ASSIGNOR TO HIMSELF AND JOHN R. LINTON, OF NEW BEDFORD, MASSACHUSETTS.

IMPROVEMENT IN WAGON-HUBS.

Specification forming part of Letters Patent No. 81,127, dated August 18, 1868.

*To all whom it may concern:*

Be it known that I, EDWIN R. BAKER, of Fairhaven, in the county of Bristol and State of Massachusetts, have invented new and useful Improvements in Wagon-Hubs; and I do hereby declare that the following is a full, clear, and exact description thereof, which will enable those skilled in the art to make and use the same, reference being had to the accompanying drawings, forming part of this specification.

This invention is designed more particularly as an improvement upon cast-metal hubs for wagons and other vehicles; and consists in forming the same in two parts, and uniting them in a more simple and superior manner than has heretofore been done with cast hubs.

In the accompanying drawing a central longitudinal section of the hub is seen, which is composed of the two parts A and B, which latter are cast hollow, and bolted together by the longitudinal bolts $a$, as will now be more fully set forth.

In casting the part B an ordinary axle-box, D, is placed in the sand, and the lower part surrounded with a core of sand, to form the cavity B' of the shell or part B. When the metal is poured into the mold it unites with the box D, and the shell or part B is thus made to form one continuous part with the said box D. The holes for the bolts $a$ are then drilled, and through them the sand forming the core is shaken out.

The part or shell A is cast hollow by means of a core in the usual manner of casting hollow forms, but having central circular openings to fit on the box D, as shown.

The parts A and B are proportioned to leave a space around the middle of the box D for the spokes C, for the purpose of clamping the said spokes between the two parts A and B, as shown.

The ends of the spokes rest against the box D, and the sides of the butts of the said spokes are in contact, and completely fill the annular space left between the inner faces of the parts A and B.

Four stout bolts, $a$, with heads and nuts, as shown, serve to clamp the spokes firmly in place, at the same time holding the two parts of the hub together.

Brass or composition may be used for the hubs of light vehicles, the same having more tensile strength than cast-iron; or the hubs may be made of cast-iron, and cast very thin, and be afterward converted into steel by the so-called Bessemer process.

The cheapness and great strength of metal hubs render them peculiarly desirable; but, as heretofore made, their greater weight and unsightly appearance restricted their use to heavy wagons, where symmetry of appearance was a minor consideration.

By my invention metal hubs are made available for buggies and carriages, for the shell is made in the external form of the ordinary wooden hubs, and the form so conduces to the strength of the parts that the shell of the two parts A and B may be made very thin, and still of sufficient strength. The bolts are also hidden from view, the nuts thereof being on the inner end of the hub.

The outer end of the box D is packed or fitted with a band of rubber or leather, or other equivalent material, for the purpose of making a tighter junction of the parts, and also to soften the concussion or jar of the same on rough roads.

The barrels $b$ of the hub are cast on the part A, and are therefore not likely to work loose.

Thus by my invention metal hubs are available for heavy and light vehicles, and are not liable to the objections inseparable from the metal hubs as heretofore made.

I claim as new and desire to secure by Letters Patent—

1. The metallic hub, cast in two hollow parts, with the part B cast upon the box D, both parts being fitted together, as described, to clasp the ends of the spokes C between them, as set forth.

2. The metallic hub, when its hollow shell B is cast upon and with the box D, as herein described, for the purpose specified.

EDWIN R. BAKER.

Witnesses:
WM. H. SHERMAN,
JOHN R. LINTON.